Feb. 23, 1937.   F. V. WALTZ   2,071,442
WEIGHING SCALE
Filed Oct. 4, 1935   2 Sheets-Sheet 2
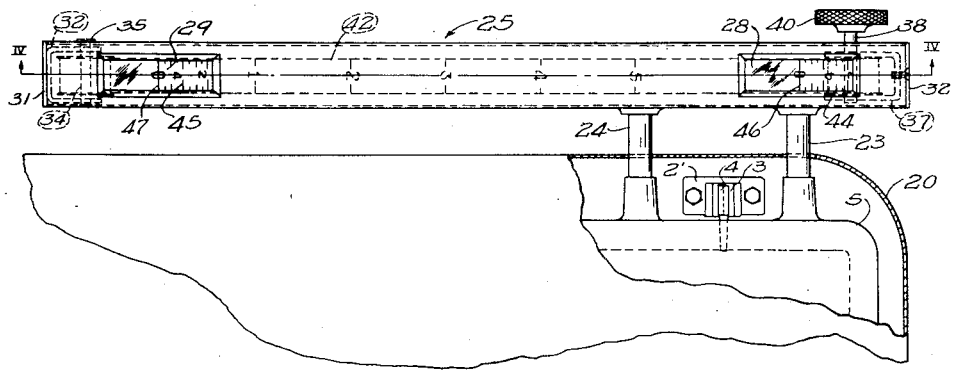
Fig. III
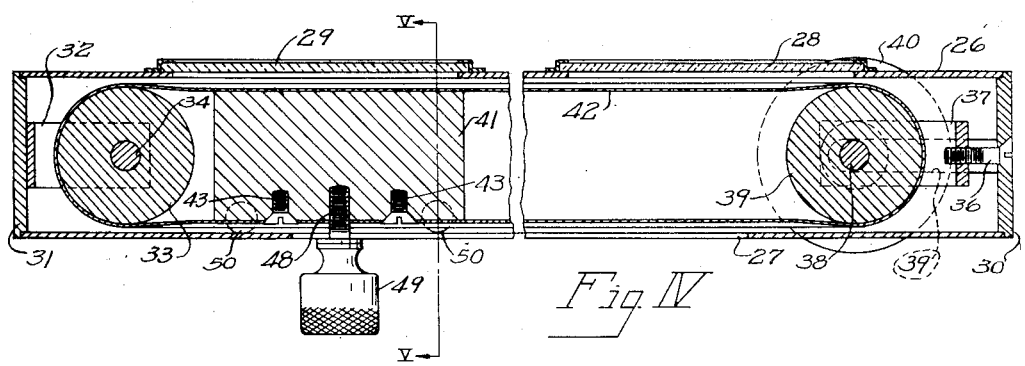
Fig. IV
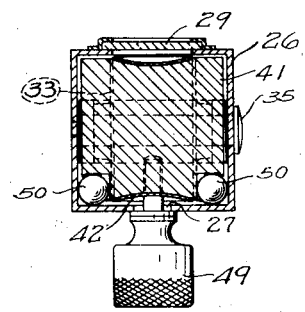
Fig. V
Foster V. Waltz
INVENTOR
BY C. O. Marshall
ATTORNEY Patented Feb. 23, 1937

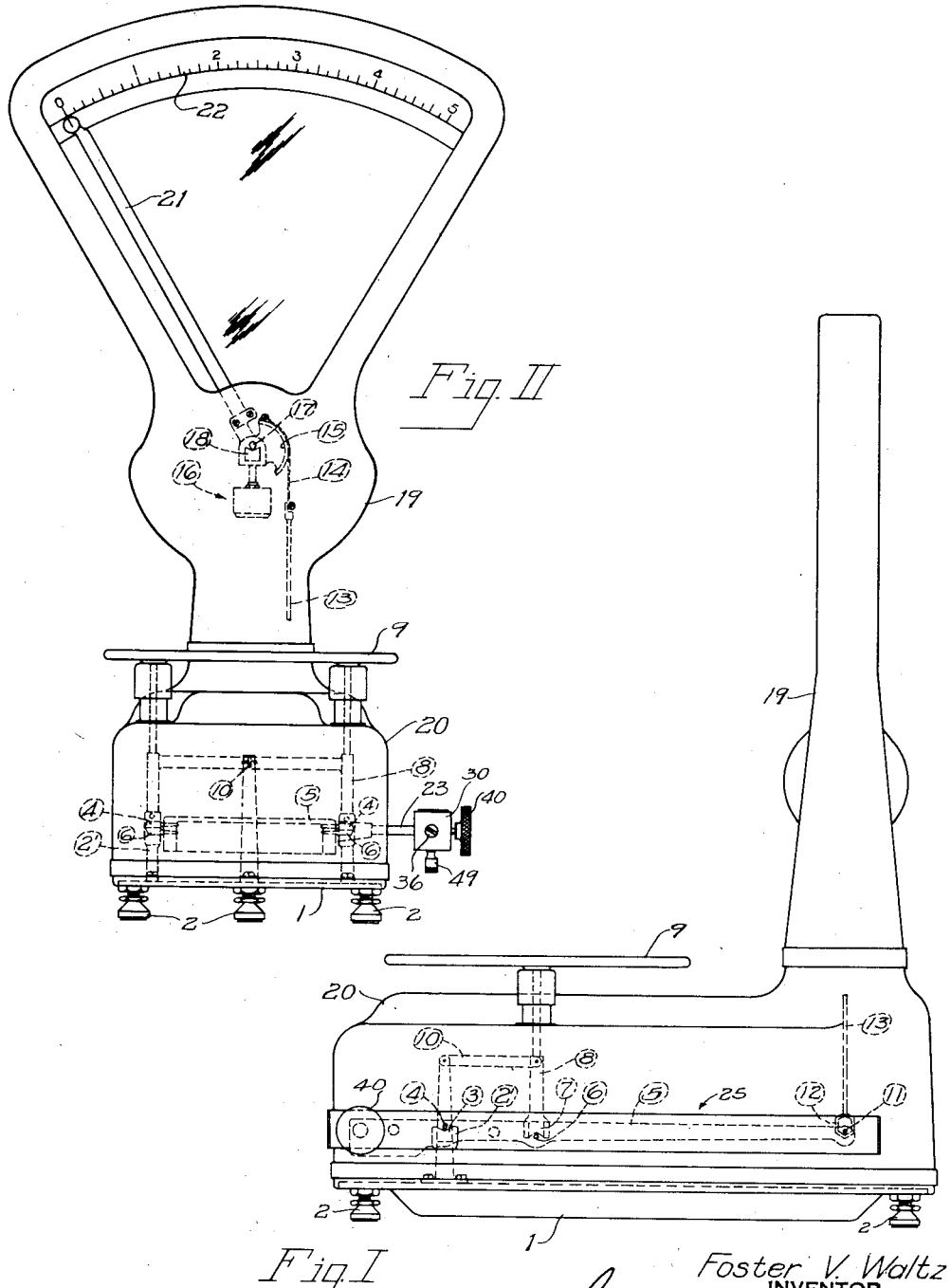

2,071,442

UNITED STATES PATENT OFFICE 2,071,442

WEIGHING SCALE

Foster V. Waltz, Toledo, Ohio, assignor to Toledo Scale Manufacturing Company, Toledo, Ohio, a corporation of New Jersey Application October 4, 1935, Serial No. 43,547

1 Claim. (Cl. 265—49)

This invention relates to weighing scales, and particularly to scales having beam and poise load-counterbalancing means, and its principal object is to provide improved means for positioning a poise and indicating its load-counterbalancing effect at the front and back ends of the scale.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a side elevational view of a scale embodying my invention.

Figure II is a front elevational view showing automatic load-counterbalancing and indicating means employed in the scale illustrated in Figure I.

Figure III is an enlarged fragmentary plan view showing means employed in the device of my invention for positioning a poise and indicating its load-counterbalancing effect, parts being broken away and parts in section.

Figure IV is a further enlarged sectional side elevational view taken along the line IV—IV of Figure III; and Figure V is a front elevational sectional view taken on the line V—V of Figure IV.

Referring to the drawings in detail:—

The scale in which I have shown my invention incorporated has a base 1 supported upon adjustable feet 2, by adjustment of which the base may be tilted to properly level the scale. Fixed upon the base 1 is a pair of fulcrum stands 2', in the upper ends of which are mounted grooved fulcrum bearings 3 which are engaged by knife-edged fulcrum pivots 4 projecting from the sides of a lever 5.

The lever 5 is provided also with projecting load pivots 6 which engage and support load bearings 7 mounted in a spider 8 and the spider 8 carries a commodity-receiver 9; the condition of level of the commodity-receiver 9 being maintained by means of a check link 10.

At its rear end the lever 5 is provided with a nose pivot 11 which engages and is supported by a bearing loop 12 hung at the lower end of a pull rod 13, the upper end of which is connected to a metallic ribbon 14 that overlies and is fastened to a fulcrum sector 15 of a load-counterbalancing pendulum 16. The load-counterbalancing pendulum is rockably supported by means of a knife-edged pivot 17 fixed to the pendulum and a grooved bearing 18 which is mounted within an upright fan-shaped housing 19 that is supported upon a box-like casing 20 which rests upon the base 1 and encloses the lever 5 and spider 8.

An indicator hand 21 is fixed to the pendulum 16 and swings with the pendulum as it moves to counterbalance loads on the commodity-receiver 9, the upper end of the indicator hand 21 moving along an arcuate chart 22 which is marked with a series of graduations and figures indicative of the weights of loads on the commodity-receiver 9.

A pair of laterally extending studs 23 and 24 are fixed to the lever 5 and project through openings in the casing 20, and a hollow beam 25 is fixed to the outer end of the studs 23 and 24. The body of the beam 25 is constructed of a rectangular metallic tube 26 having a longitudinally extending slot 27 in its bottom side and transparent windows 28 and 29 at the front and rear ends of its top side, the front and rear ends of the rectangular tube 26 being closed by plates 30 and 31.

Fixed to the plate 31 is a U-shaped bracket 32, between the arms of which is rotatably mounted a pulley 33, the axle of the pulley being a pin 34 which extends through the side walls of the rectangular tube 26 and the arms of the bracket 32. The pin 34 is provided at one end with a head 35, which may have a slot to be engaged by a screwdriver, and the other end of the pin is threaded and screwed into the opening in the side wall of the rectangular tube 26. The pin 34 thus serves to removably hold the plate 31, bracket 32 and pulley 33 in place.

Connected to the plate 30 by means of a screw 36 is a U-shaped bracket 37 and rotatably journaled in the arms of the bracket 37 is a shaft 38 upon which is fixed a pulley 39. The pulley thus is mounted for rotation between the arms of the bracket 37. The shaft 38 extends through a notch 39' which is cut into one end of the side wall of the rectangular tube 26 and fixed upon the outer end of the shaft 38 is a knurled wheel 40.

Slidably mounted within the rectangular tube 26 is a poise 41, and a metallic tape 42 has its ends secured to the poise 41 by screws 43, with its intermediate portion extending over the pulleys 33 and 39 and lying along the top side of the rectangular tube 26. The metallic tape 42 is preferably bowed transversely, so that the portion extending from one pulley to the other along the top side of the rectangular tube 26 does not sag, and the material of the metallic tape 42 is sufficiently flexible so that it flattens transversely where it is curved longitudinally over the pulleys. The outer face of the tape 42 is marked with duplicate sets of figures and graduations 44 and 45 which are visible to the merchant and customer respectively, through the windows 28 and 29 in the top side of the rectangular tube 26, the figures and graduations 44 and 45 being so located and spaced with respect to index lines 46 and 47 that the figures and graduations in registration within the index lines indicate the load-counterbalancing effect of the poise 41 in a series of positions along the beam 25.

The poise 41 is provided with a threaded socket 48 into which is screwed the threaded shank of a knob 49 and is also provided with sockets containing anti-friction bearing balls 50 to increase the ease with which the poise may be moved longitudinally of the rectangular tube 26. The poise may be moved within the tube either by means of the knob 49 or by means of the wheel 40. When the poise is to be moved a considerable distance it may be more conveniently and quickly moved by means of the knob 49, but it may be more conveniently set in exact position by means of the wheel 40. When desired, the poise may be locked against movement by turning the knob 49 to screw the knob shank into the socket 48 and thus clamp the knob and poise together against the bottom side of the rectangular tube 26.

As the poise is moved from one position to another the tape 42 moves to bring the figures and graduations with which it is marked into registration with the indexes 46 and 47; the figures and graduations being so located on the tape that identical indications of the load-counterbalancing effect of the poise are visible through the windows 28 and 29, the figures visible through the window 28 being so turned as to be readable by a merchant standing in front of the scale and the figures visible through the window 29 being so turned as to be readable by a person standing back of the scale.

The tension of the tape 42 may be adjusted by turning the screw 36. When it is desired to disassemble the device, the knob 49 and the pin 34 are removed. The pulleys, tape and poise, with the plate 30 and bracket 37, then may be withdrawn through the front end of the tube by pulling the shaft 38 forwardly in the notch through which it extends.

The embodiment of my invention herein shown and described is to be regarded as illustrative only, and it is to be understood that the invention is susceptible to variation, modification and change within the spirit and scope of the subjoined claim.

Having described my invention, I claim:

In a weighing scale, in combination, weighing mechanism including an indicator facing forwardly toward the operator's end of the scale, a hollow beam extending fore and aft from adjacent the customer's end of the scale to adjacent the operator's end of the scale, a poise disposed within said beam, means at the operator's end of said beam for positioning said poise at various positions along said beam, and means at the customer's end of said beam and at the operator's end of said beam for indicating the load-counterbalancing effect of said poise.

FOSTER V. WALTZ.